US008775582B2

(12) United States Patent
Miyamoto et al.

(10) Patent No.: US 8,775,582 B2
(45) Date of Patent: Jul. 8, 2014

(54) COMMUNICATION DEVICE SETTING APPARATUS, COMMUNICATION DEVICE SETTING METHOD, AND RECORDING MEDIUM

(75) Inventors: Hirokatsu Miyamoto, Tokyo (JP); Minoru Kataoka, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 48 days.

(21) Appl. No.: 13/238,486

(22) Filed: Sep. 21, 2011

(65) Prior Publication Data

US 2012/0084418 A1    Apr. 5, 2012

(30) Foreign Application Priority Data

Oct. 1, 2010 (JP) ................... 2010-224401

(51) Int. Cl.
*G06F 15/177* (2006.01)
(52) U.S. Cl.
USPC ............................ 709/222; 709/203; 709/221
(58) Field of Classification Search
USPC ........................................ 709/222, 203, 221
See application file for complete search history.

(56) References Cited

U.S. PATENT DOCUMENTS

| 7,546,357 | B2* | 6/2009 | Manchester et al. | 709/220 |
|---|---|---|---|---|
| 7,840,683 | B2* | 11/2010 | Zhang | 709/227 |
| 7,856,646 | B1* | 12/2010 | Groff et al. | 725/42 |
| 8,161,527 | B2* | 4/2012 | Curren | 726/2 |
| 2005/0027851 | A1* | 2/2005 | McKeown et al. | 709/224 |
| 2005/0289266 | A1* | 12/2005 | Illowsky et al. | 710/104 |
| 2007/0211653 | A1* | 9/2007 | Mizukoshi | 370/312 |
| 2008/0028318 | A1* | 1/2008 | Shikuma | 715/744 |
| 2008/0046996 | A1* | 2/2008 | Smith et al. | 726/15 |
| 2008/0051027 | A1* | 2/2008 | Lee | 455/3.06 |
| 2008/0056722 | A1* | 3/2008 | Hendrix et al. | 398/108 |
| 2008/0098458 | A2* | 4/2008 | Smith et al. | 726/3 |
| 2008/0115013 | A1 | 5/2008 | Jung et al. | |
| 2009/0109980 | A1* | 4/2009 | Zuili | 370/400 |
| 2010/0016683 | A1* | 1/2010 | Lemmers et al. | 600/301 |
| 2010/0097527 | A1* | 4/2010 | Shin | 348/723 |

(Continued)

FOREIGN PATENT DOCUMENTS

| EP | 1276275 A2 * | 1/2003 | ............ H04L 12/24 |
|---|---|---|---|
| JP | 2008-028788 | 2/2008 | |
| JP | 2010-124254 | 6/2010 | |
| WO | WO03-101040 | 12/2003 | |

OTHER PUBLICATIONS

The extended European search report mailed Dec. 27, 2011.
Japanese Office Action dated Mar. 18, 2014.

*Primary Examiner* — Waseem Ashraf
(74) *Attorney, Agent, or Firm* — IPUSA, PLLC

(57) ABSTRACT

A communication device setting apparatus is arranged to register setup information in a communication device connected to the communication device setting apparatus via a communication network. In the communication device setting apparatus, a device setting unit recognizes an access from the communication device upon power up of the communication device, acquires setup information, which is specific to the communication device and contains a MAC address of the communication device, from list information pre-recorded in the communication device setting apparatus, and performs a setting process to set the acquired setup information in the communication device. A setting management unit detects an end of the setting process performed by the device setting unit, changes the list information based on the setup information having been set in the communication device after the end of the setting process, and manages the communication device according to the changed list information.

12 Claims, 7 Drawing Sheets

(56) References Cited

U.S. PATENT DOCUMENTS

| | | | |
|---|---|---|---|
| 2010/0257549 A1* | 10/2010 | Nam | 725/25 |
| 2011/0237184 A1* | 9/2011 | Minoshima et al. | 455/39 |
| 2011/0252440 A1* | 10/2011 | Sridhara et al. | 725/31 |
| 2012/0227067 A1* | 9/2012 | Ma et al. | 725/32 |
| 2012/0265324 A1* | 10/2012 | Colombo et al. | 700/29 |

* cited by examiner

FIG.7A

| MAC ADDRESS | HDCP KEY FILE NAME | MARLIN KEY FILE NAME | WRITING STATE | ... |
|---|---|---|---|---|
| 0060C0000000 | HDPC00001 | MARLIN00001 | unreg | ... |
| 0060C0000001 | HDPC00002 | MARLIN00002 | unreg | ... |
| 0060C0000002 | HDPC00003 | MARLIN00003 | unreg | ... |
| 0060C0000003 | HDPC00004 | MARLIN00004 | unreg | ... |
| 0060C0000004 | HDPC00005 | MARLIN00005 | unreg | ... |
| 0060C0000005 | HDPC00006 | MARLIN00006 | unreg | ... |
| 0060C0000006 | HDPC00007 | MARLIN00007 | unreg | ... |
| 0060C0000007 | HDPC00008 | MARLIN00008 | unreg | ... |
| ... | ... | ... | ... | ... |

FIG.7B

| FACTORY NAME | DATE OF WRITING | SERIAL NUMBER | MAC ADDRESS | HDCP KEY FILE NAME | MARLIN KEY FILE NAME | ... |
|---|---|---|---|---|---|---|
| CTE | 1003161601 | S1000-0000109 | 0060C0000000 | HDPC00001 | MARLIN00001 | ... |
| CTE | 1003161603 | S1000-0000110 | 0060C0000001 | HDPC00002 | MARLIN00002 | ... |
| CTE | 1003301651 | S1000-0000111 | 0060C0000002 | HDPC00003 | MARLIN00003 | ... |
| CTE | 1003301701 | S1000-0000111 | 0060C0000003 | HDPC00004 | MARLIN00004 | ... |
| CTE | 1003301703 | S1000-0000111 | 0060C0000004 | HDPC00005 | MARLIN00005 | ... |
| 0060C0000055 | HDPC00056 | MARLIN00056 | unreg | | | |
| 0060C0000056 | HDPC00057 | MARLIN00057 | unreg | | | |
| 0060C0000057 | HDPC00058 | MARLIN00058 | unreg | | | |
| ... | ... | ... | ... | | | |

COMMUNICATION DEVICE SETTING APPARATUS, COMMUNICATION DEVICE SETTING METHOD, AND RECORDING MEDIUM

CROSS-REFERENCE TO RELATED APPLICATION

This application is based upon and claims the benefit of priority of Japanese patent application No. 2010-224401, filed on Oct. 1, 2010, the entire contents of which are incorporated by reference in their entirety.

BACKGROUND OF THE INVENTION

1. Field of the Invention

The present disclosure relates to a communication device setting apparatus, a communication device setting method, and a recording medium, which are adapted to perform various setup operations for communication devices correctly and efficiently.

2. Description of the Related Art

Conventionally, a communication device (communication interface) is required to carry out wired or wireless communications with an external device, such as a PC (personal computer), a server, a router or a personal digital assistant. In recent years, another communication device, such as an STB (set-top box), is also available. The STB is usually connected to a television set (TV) for accessing a predetermined server in a communication network and for receiving various services from the predetermined server.

In order to identify the communication devices individually, a MAC (media access control) address is assigned to each communication device. A MAC address is a unique identifier assigned to network interfaces (nodes) for communications on the physical network segment, and it is a universally administered address. A MAC address has a 48-bit data length. The first 24 bits of this MAC address identify the manufacturer that issued the identifier and are uniquely assigned to the manufacturer by the IEEE Standards Committee, while the remaining 24 bits are uniquely assigned to a device by its manufacturer.

When the above-described communication devices are shipped by the manufacturer, a MAC address is written or burned in a recording area (or a memory) of a network interface card of each communication device by the manufacturer. With the use of MAC addresses, the transmitting/receiving of various data between predetermined communication devices is enabled on the communication networks (including wired and wireless communication networks) through the Ethernet.

Furthermore, when communications of encrypted data between communication devices are carried out, key information, including an encryption key and a decryption key, is written or recorded in a recording area of each communication device together with the MAC address.

Conventionally, the operation of writing the setup information, containing the MAC address and the key information, in the recording area of the communication device is manually performed by a human operator. Because the above-mentioned operation is manually performed by the operator, the operator directly deals with the proprietary information specific to the communication device, such as the MAC address and the key information.

Furthermore, with respect the key information, the administrator has to take a long time to input to the communication device a secret key or a character string which is the source of a secret key. Because the character string or the secret key is input to the communication device by the administrator directly, it is necessary that the character string or the secret key is text data that is visible to any person. Hence, there has been a possibility that the character string or the secret key is illegally copied.

To eliminate the problem, International Publication No. WO 2003/101040 discloses a secret key management device which includes an encryption unit which encrypts a secret key based on device identification information that identifies a communication device, and a transmitting unit which transmits the secret key encrypted by the encryption unit to the communication device.

However, according to the conventional technique as disclosed in International Publication No. WO 2003/101040, the MAC address as the device identification information must be beforehand set to the communication device in order to allow the secret key management device to carry out the encryption communications with the communication device. This secret key management device merely stores the secret key, and does not store the MAC address that identifies the communication device. Hence, a setup operation for performing communications between the secret key management device and the communication device must be performed beforehand. In this setup operation, the MAC address must be manually input to the secret key management device by the human operator. Hence, there are problems in that a mistake in the input operation may arise, the number of man-hours of the manual operation may increase, and the management may become complicated.

SUMMARY OF THE INVENTION

In one aspect, the present disclosure provides a communication device setting apparatus, a communication device setting method, and a recording medium which are adapted to perform various setup operations for communication devices correctly and efficiently.

In an embodiment which solves or reduces one or more of the above-mentioned problems, the present disclosure provides a communication device setting apparatus arranged to register setup information in a communication device that is connected to the communication device setting apparatus via a communication network, the communication device setting apparatus including: a device setting unit to recognize an access from the communication device upon power up of the communication device, acquire setup information, which is specific to the communication device and contains a MAC address of the communication device, from list information pre-recorded in the communication device setting apparatus, and perform a setting process to set the acquired setup information in the communication device; and a setting management unit to detect an end of the setting process performed by the device setting unit, change the list information based on the setup information having been set in the communication device after the end of the setting process, and manage the communication device according to the changed list information.

In an embodiment which solves or reduces one or more of the above-mentioned problems, the present disclosure provides a communication device setting method for use in a communication device setting apparatus to register setup information in a communication device that is connected to the communication device setting apparatus via a communication network, the communication device setting apparatus including a device setting unit and a setting management unit, the communication device setting method including: recognizing, by the device setting unit, an access from the communication device upon power up of the communication device; acquiring, by the device setting unit, setup information, which is specific to the communication device and contains a MAC address of the communication device, from list information pre-recorded in the communication device setting apparatus; performing, by the device setting unit, a setting process to set the acquired setup information in the communication device; detecting, by the setting management unit, an end of the setting process performed by the device setting unit; changing, by the setting management unit, the list information based on the setup information having been set in the communication device after the end of the setting process; and managing, by setting management unit, the communication device according to the changed list information.

Other objects, features and advantages of the present disclosure will be apparent from the following detailed description when read in conjunction with the accompanying drawings.

BRIEF DESCRIPTION OF THE DRAWINGS

FIG. 7A and FIG. 7B are diagrams showing an example of the management list in this embodiment.

DETAILED DESCRIPTION OF PREFERRED EMBODIMENTS

Figure 1:
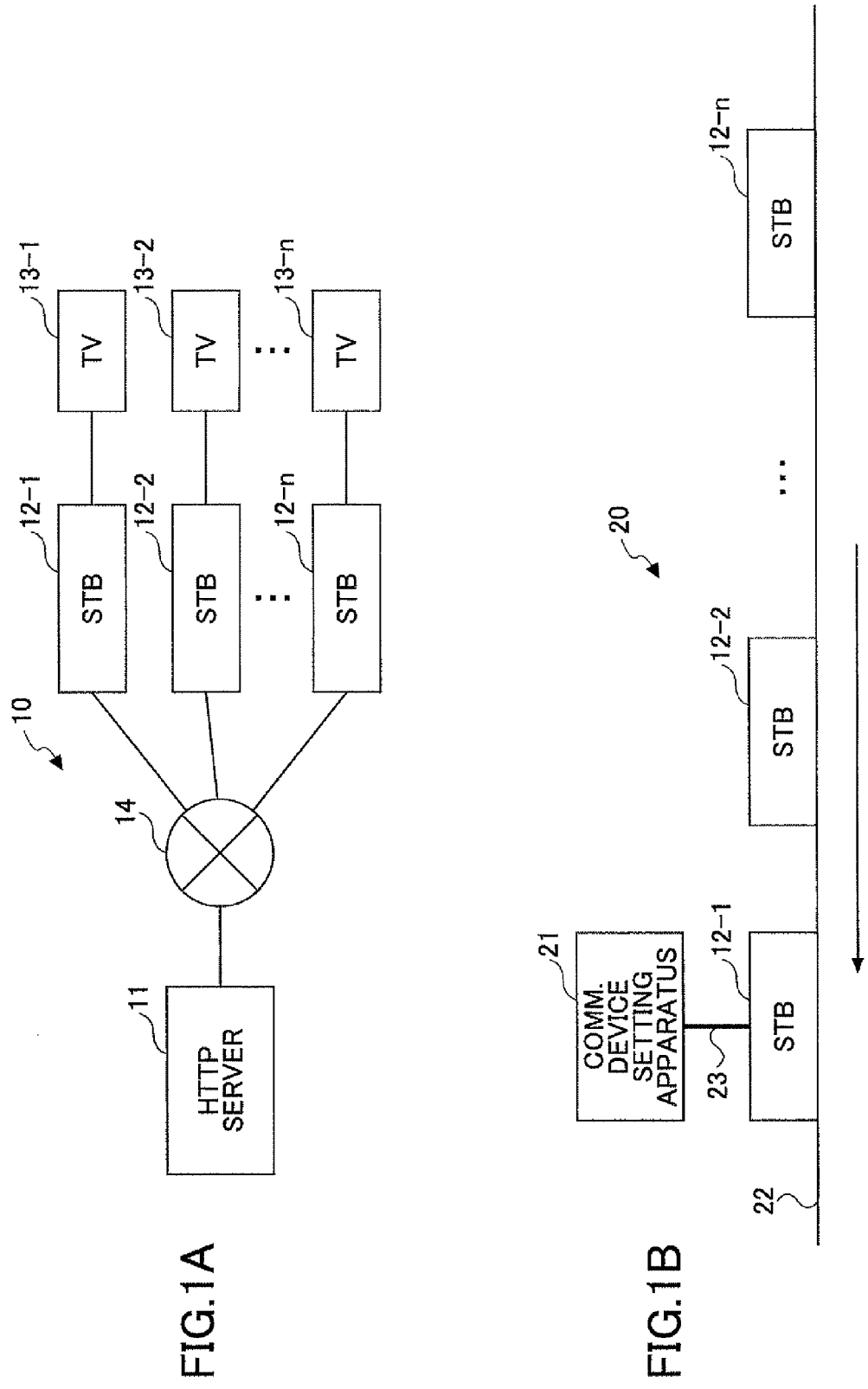
FIG. 1A and FIG. 1B are diagrams showing an example of a communication device setting system to which an embodiment of the present disclosure is applied.

The present disclosure is typically applied for the manufacturing processes and maintenance of communication devices. Specifically, the communication device setting apparatus of the present disclosure is arranged to have at least one of the following four functions.

The first function is to automatically write a MAC address and key information, such as a DRM (digital rights management) key, in a communication device, such as an STB or a digital TV. Thereby, the setup operation of writing the MAC address in the communication device performed by the human operator is fully automated.

The second function is to automate the operation of encryption of the key information to be written. Moreover, when writing the key information, information needed for encryption is received from the target communication device, and the key information is encrypted automatically.

The third function is to automatically manage the setup information, such as the MAC address and the key information. That is, the setup information, such as the MAC address to be written or already written in the target communication device and the DRM key, is managed automatically. Specifically, a management list (list information) is automatically generated, or a management list (list information) that is beforehand set up is received from an external device, and the written key information is moved to another directory or folder for management.

The fourth function is to store address information that is the same as address information of an HTTP (hypertext transfer protocol) server, in the communication device setting apparatus of the present disclosure, the address information of the HTTP server being used by a communication device to automatically access the HTTP server upon power up of the communication device. The communication device setting apparatus may be arranged to cause the communication device to automatically access the communication device setting apparatus upon power up of the communication device, instead of accessing the HTTP server, and thereafter the MAC address and the key information are set in the communication device. The communication device setting process may be performed as a part of manufacturing processes of the communication device, and may be performed also at a time of resetting of the communication device.

The communication device to which an embodiment of the present disclosure is applicable may be any one of an STB, a PC, a digital TV, which are capable of communications via a predetermined communication protocol, such as Ethernet protocol, and a personal digital assistant, a cellular phone, a portable player, a game machine, which are capable of performing data communications via a communication network. The key information to which an embodiment of the present disclosure is applicable may contain at least one of a HDCP (high-bandwidth digital content protection) key, and a Marlin key. Marlin DRM is a digital content management system for CE (consumer electronics) devices and multimedia services, and its technical specifications are available at Marlin Developer Community established in 2006.

A description will now be given of embodiments of the present disclosure with reference to the accompanying drawings.

FIG. 1A and FIG. 1B are diagrams showing an example of a communication device setting system to which an embodiment of the present disclosure is applied. In this embodiment, an STB is used as a communication device. STBs are usually arranged in a content providing system as shown in FIG. 1A.

As shown in FIG. 1A, the content providing system 10 is constructed to include an HTTP server 11, a plurality of STBs 12-1, 12-2, . . . , 12-$n$, and a corresponding number of TVs 13-1, 13-2, . . . , 13-$n$, for the number of STBs 12. The HTTP server 11 and the STBs 12 are interconnected by a communication network 14 using the Ethernet protocol, such as the Internet, such that data can be transmitted and received therebetween.

The HTTP server 11 is a web server for providing the TVs 13-1 to 13-$n$ with respective contents, such as digital broadcasting programs, via the STBs 12-1 to 12-$n$ in the communication network 14. The web server is provided for managing user information of the STBs 12 connected in the content providing system 10. The HTTP server 11 may be a broadcasting station which provides broadcasting programs. The HTTP server 11 may provide digital broadcasting programs, and various contents, including displays of HTML, still image, and moving image objects. The HTTP server 11 individually manages the STB 12 for every content provider, and can be set up to determine what kind of data is to be provided to the user who uses the STB 12.

When performing a content providing service, such as user-limited provision, the HTTP server 11 encrypts the program data being provided beforehand, and transmits the encrypted data. At the STB 12, the encrypted data is received and decrypted with a decryption key (secret key) stored beforehand in the STB 13, and outputs the decrypted content to the TV 13. The TV 13 can display the content which is successfully decrypted on its monitor in a legible manner. The user-limited provision of the encrypted program is possible for registered viewers of the respective STBs 12.

The HTTP server 11 is provided to include a service providing program to provide each STB 12 with the digital content, and performs the above-described process in accordance with the service providing program when executed by the server.

The STB 12 decrypts the content data received from the HTTP server 11 for the corresponding TV 13 to which the STB 12 is connected, and sets up the state of the TV monitor to output the set-up information to the TV 13.

The TV 13 is a display unit that displays the content information received from the HTTP server 11. The display unit according to the present disclosure is not limited to the TV 13 (television set), and may be a PC, a PDA (personal digital assistant), etc. provided with a normal display device. Alternatively, the STB 12 and the TV 13 may be constructed into an integral module.

In order to transmit data to and receive data from the HTTP server 11, the STB 12 stores identification information or address information, such as a MAC address, beforehand. The HTTP server 11 can identify each of the STBs 12-1 to 12-n by its MAC address, and can provide the digital content to the predetermined user (registered viewer).

The STB 12 before shipment needs to set up to store the setup information which is confidential and specific to that device, such as a MAC address and key information, as described above. In this embodiment, a communication device setting system 20 as shown in FIG. 1B is used to perform the communication device setting process correctly and efficiently.

As shown in FIG. 1B, the communication device setting system 20 is constructed to include a communication device setting apparatus 21, and a transporting unit 22, such as a conveyor belt, which conveys the STBs 12-1 to 12-n.

The communication device setting apparatus 21 is set up beforehand to store address information, such as an IP address that is the same as an IP address of the HTTP server 11 described above. The address information may differ for every content provider. Because the address information of an access point fixed to each content provider is set up beforehand in each of the STBs 12-1 to 12-n, the address information in conformity with such address information is set also to the communication device setting apparatus 21. In this embodiment, upon starting of each STB 12, the STB 12 can access the communication device setting apparatus 21 shown in FIG. 1B as if the STB 12 had accessed the HTTP server 11 shown in FIG. 1A.

In the communication device setting apparatus 21, a plurality of address information items corresponding to a plurality of content providers are stored beforehand. One of the address information items corresponding to address information of a communication destination recorded in one of the STBs 12-1 to 12-n can suitably be selected.

In the communication device setting system 20 shown in FIG. 1B, to allow the mass-production operation of the STBs 12-1 to 12-n, it is necessary to continuously perform registration of setup information, such as a MAC address and key information, in the STBs 12-1 to 12-n. The registration of the setup information must be performed individually to the respective STBs 12 which are continuously conveyed by the transporting unit 22.

In this embodiment, in order to perform the one-to-one communications between the communication device setting apparatus 21 and the STB 12 which are connected together by an Ethernet cable 23, when a formal MAC address has not yet been set to the STB 12 by using the communication device setting system 20, a dummy MAC address is set up beforehand to each of the STBs 12-1 to 12-n. In this state, data can be transmitted and received between the communication device setting apparatus 21 and the STB 12. It is assumed that the dummy MAC addresses set up in the STBs 12-1 to 12-n are identical to each other.

Based on the setup information, such as a MAC address and key information, contained in the management list which is stored beforehand in the communication device setting apparatus 21, the communication device setting system 20 performs registration of the setup information for the respective STBs 12, and stores the result of the registration in the communication device setting apparatus 21 as the log information or the like.

In the communication device setting system 20, when one of the STBs 12-1 to 12-n is conveyed to the communication device setting apparatus 21 by the transporting unit 22, the STB 12 is manually connected to the communication device setting apparatus 21 by the Ethernet cable 23 by a human operator. If the STB 12 connected is turned on, the setup information is automatically stored in the STB 12.

Figure 2:
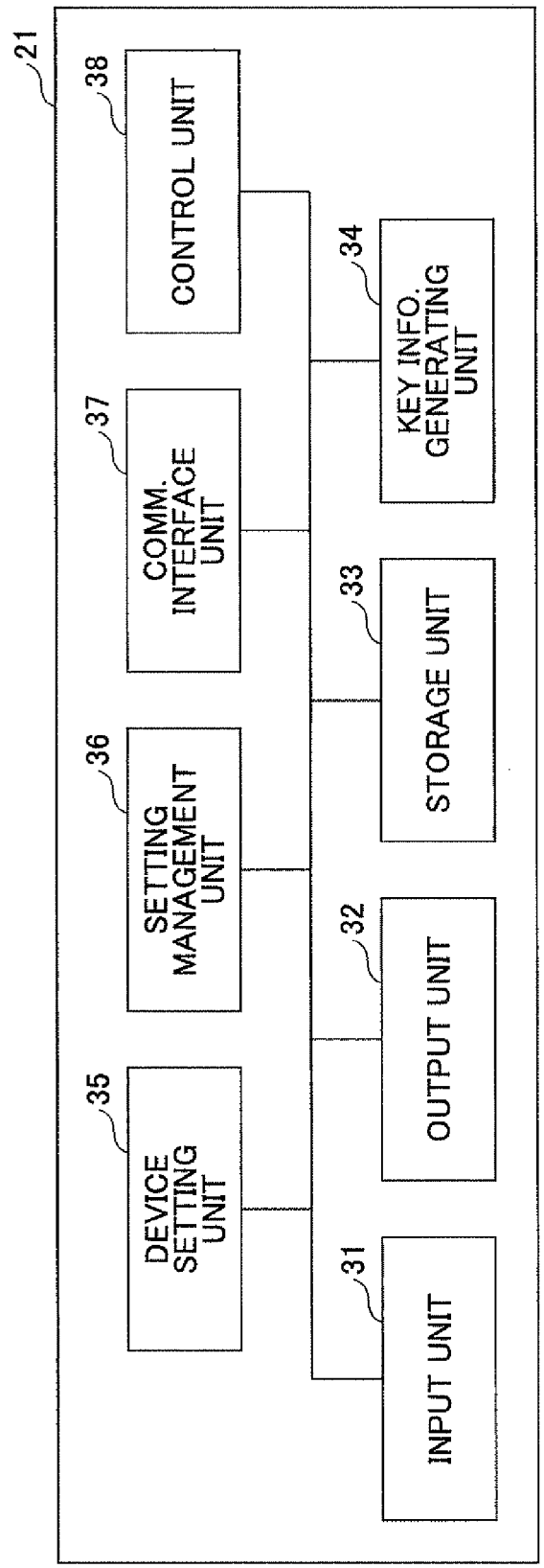
FIG. 2 is a diagram showing the functional composition of a communication device setting apparatus of an embodiment of the present disclosure.

Next, the functional composition of the communication device setting apparatus 21 shown in FIG. 1B will be described. FIG. 2 is a diagram showing the functional composition of the communication device setting apparatus 21.

As shown in FIG. 2, the communication device setting apparatus 21 is constructed to include an input unit 31, an output unit 32, a storage unit 33, a key information generating unit 34, a device setting unit 35, a setting management unit 36, a communication interface unit 37, and a control unit 38.

The input unit 31 receives various commands, such as a key information creation command, a device setting command, and a setting management command, which are input by a user. The input unit 31 is constructed to include a keyboard and a pointing device, such as a mouse.

The output unit 32 performs displaying and outputting of the content input by the input unit 31 and the result of the process performed based on the input content. The output unit 32 is constructed to include a display monitor, a loudspeaker, etc. The output unit 32 may have a function of a printer. The output unit 32 in this case can print a variety of information acquired, such as a device setting result and log information, to a printing medium.

The input unit 31 and the output unit 32 may be constructed into an integral input/output device, such as a touch panel.

The storage unit 33 stores the key information acquired by the key information generating unit 34, the log information, the management list used to perform registration of the setup information in the communication devices, various programs, such as a management application performed for this embodiment, necessary data for this embodiment, and various data obtained in this embodiment. The storage unit 33 reads out the various data stored therein, if needed.

Furthermore, the storage unit 33 may be set up beforehand to include a plurality of folder areas, such as an application folder, a pre-writing key storage folder, a written key storage folder, a writing encryption key folder, a written encryption key folder, etc., so that predetermined data can be stored in each of these folder areas.

The key information generating unit 34 generates the key information (an HDCP key, a Marlin key, etc.) which is to be recorded in each communication device. Specifically, the key information generating unit 34 generates a predetermined encryption key and a predetermined decryption key (secret key) using the key file information stored in the management list set up beforehand, and stores the file name of each key and the key information (each key itself) in the storage unit 33.

The device setting unit 35 generates command information and outputs the command information to the STB 12 connected via the communication interface unit 37, so that the STB 12 (which is the target communication device) is caused to automatically receive the key information stored in the predetermined area of the storage unit 33.

The command generated by the device setting unit 35 is a normal data transfer command used in a predetermined program, such as UNIX, and this command is equivalent to the command that can be transmitted from the HTTP server 11 to the STB 12.

The STB 12 is not required for a special control process, and, as if it had performed a predetermined command in response to a command execution request from the HTTP server 11, the STB 12 performs a predetermined command in response to a command execution request from the communication device setting apparatus 21. Hence, the STB 12 receives the setup information (such as the MAC address and the key information) stored in the predetermined area of the communication device setting apparatus 21, and stores the acquired information in the storage area of an EEPROM (electrically erasable programmable read-only memory), a NAND flash memory, a NOR flash memory, etc. For example, the key information may be stored in the NAND flash memory or the NOR flash memory.

The setting management unit 36 detects an end of the process of registration of the setup information to the STB 12 performed by the device setting unit 35. The setting management unit 36 changes or updates the list information (or the management list) based on the setup information having been set in the STB 12 after the end of the process. Specifically, the setting management unit 36 determines what kinds of the MAC address and the key information are assigned to each communication device (STB), and when the setup information is stored in each communication device (STB). The setting management unit 36 stores the updated list information (or the updated management list). The management list will be described later.

The communication interface unit 37 is connected to the STB 12 via an Ethernet cable or the like, and performs the transmitting/receiving of data to/from the STB 12. Alternatively, the communication interface unit 37 may be connected to the STB 12 by a wired connection or by a wireless connection.

The control unit 38 controls the component parts of the communication device setting apparatus 21. Specifically, the control unit 38 controls the writing of the setup information to the STB 12, the encryption of the key information, etc., in conjunction with the STB 12.

In the communication device setting apparatus 21 described above, a program (communication device setting program) for causing a computer to execute each function is prepared, and the program is recorded on a recording medium. The communication device setting process can be performed by installing the program in a personal computer, a server, etc. through the recording medium.

Figure 3:
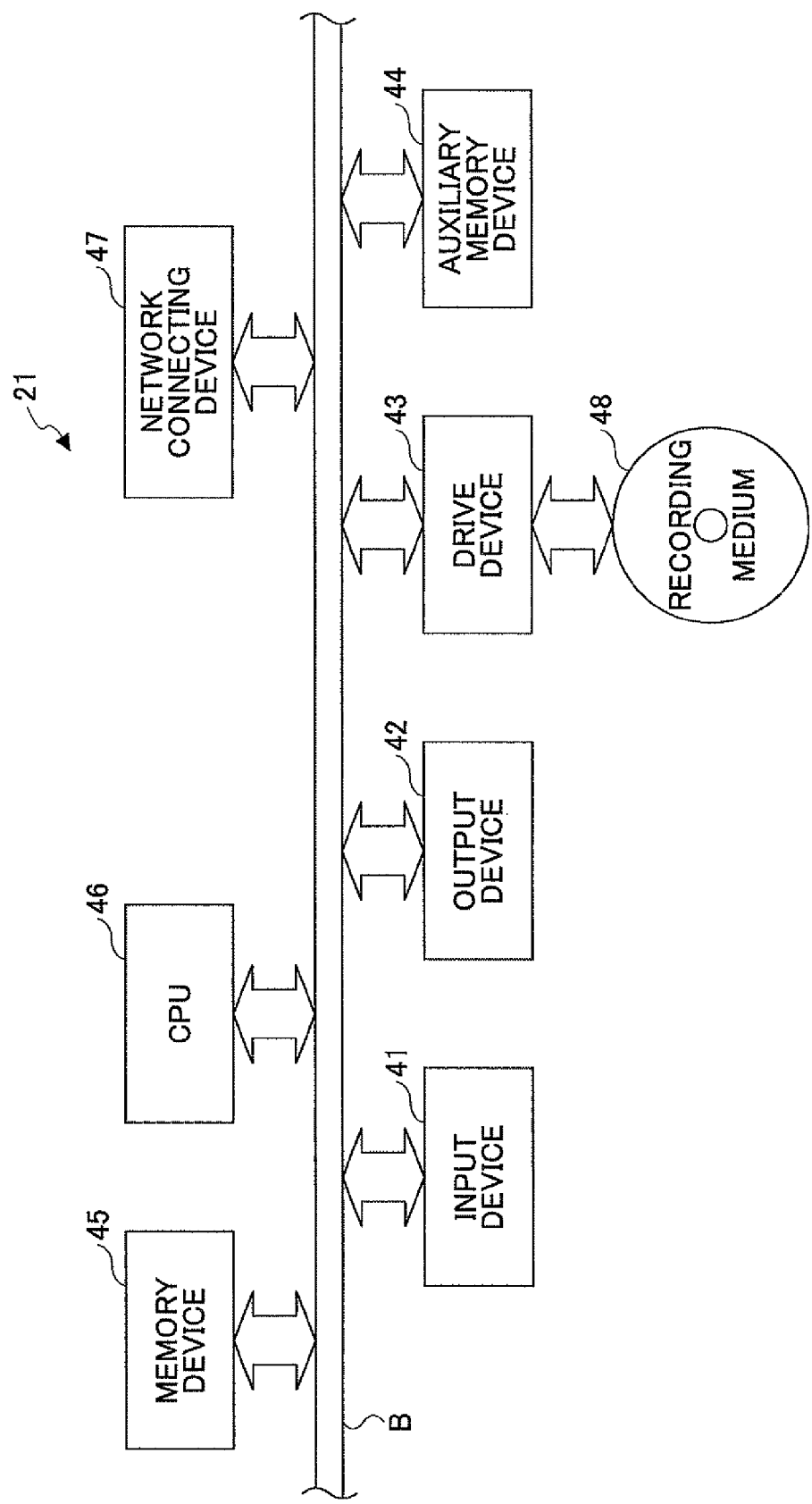
FIG. 3 is a diagram showing the hardware composition of the communication device setting apparatus of this embodiment.

Next, the hardware composition of the communication device setting apparatus (computer) of this embodiment to perform the communication device setting process will be described. FIG. 3 is a diagram showing the hardware composition of the communication device setting apparatus of this embodiment.

As shown in FIG. 3, the communication device setting apparatus (computer) is constructed to include an input device 41, an output device 42, a drive device 43, an auxiliary memory device 44, a memory device 45, a CPU (central processing unit) 46 that perform various control, and a network connecting device 47, and these elements are interconnected by a system bus B.

The input device 41 includes a keyboard and a pointing device, operated by a user, such as a mouse, and inputs various operational signals, such as a program execution request from a user.

The output device 42 includes a display unit which displays various windows and data, needed for causing the computer main part to perform the process of the present disclosure, and can display the progress or the result of the execution of the program in accordance with the control program of the CPU 46. Furthermore, the output device 42 includes a printer unit which prints the processing result to a printing medium, such as paper, which will be provided for a user to view the content of the printed result.

The executive program to be installed in the computer main part is supplied through a USB (Universal Serial Bus) memory, a CD-ROM, a DVD, a removable recording-medium 48, for example. The recording medium 48 in which the executive program is recorded can be set in the drive device 43, and the executive program read from the recording medium 48 is installed in the auxiliary memory device 44 through the drive device 43.

The auxiliary memory device 44 is a storage device, such as a hard disk drive, which can store the executive program of the present disclosure, the control program installed in the computer, and can output or input the execution program if needed.

The memory device 45 stores the executive program read from the auxiliary memory device 44 by the CPU 46. The memory apparatus 45 may include a ROM, a RAM, etc. Based on the control program, such as the OS (operating system), and the executive program stored in the memory device 45, the CPU 46 controls processing of the whole computer, such as various operations and inputting/outputting of data with the hardware component parts and performs respective processes. A variety of information required for the program execution can be received from the auxiliary memory device 44 and can also store the program execution result.

The network connecting device 47 is connected to a communication network, can receive the executive program from an external device connected to the communication network, and can supply to an external device the executive program or the executed result obtained by executing the program. Moreover, the network connecting device 47 can transmit data to and receive data from a communication device connected thereto, and can receive the management list from an external device and output the log information to the external device.

By using the above-described hardware composition of the communication device setting apparatus, the communication device setting process of the present disclosure can be performed. The communication device setting process of the present disclosure may be easily performed on a general-purpose personal computer by installing the program.

Figure 4:
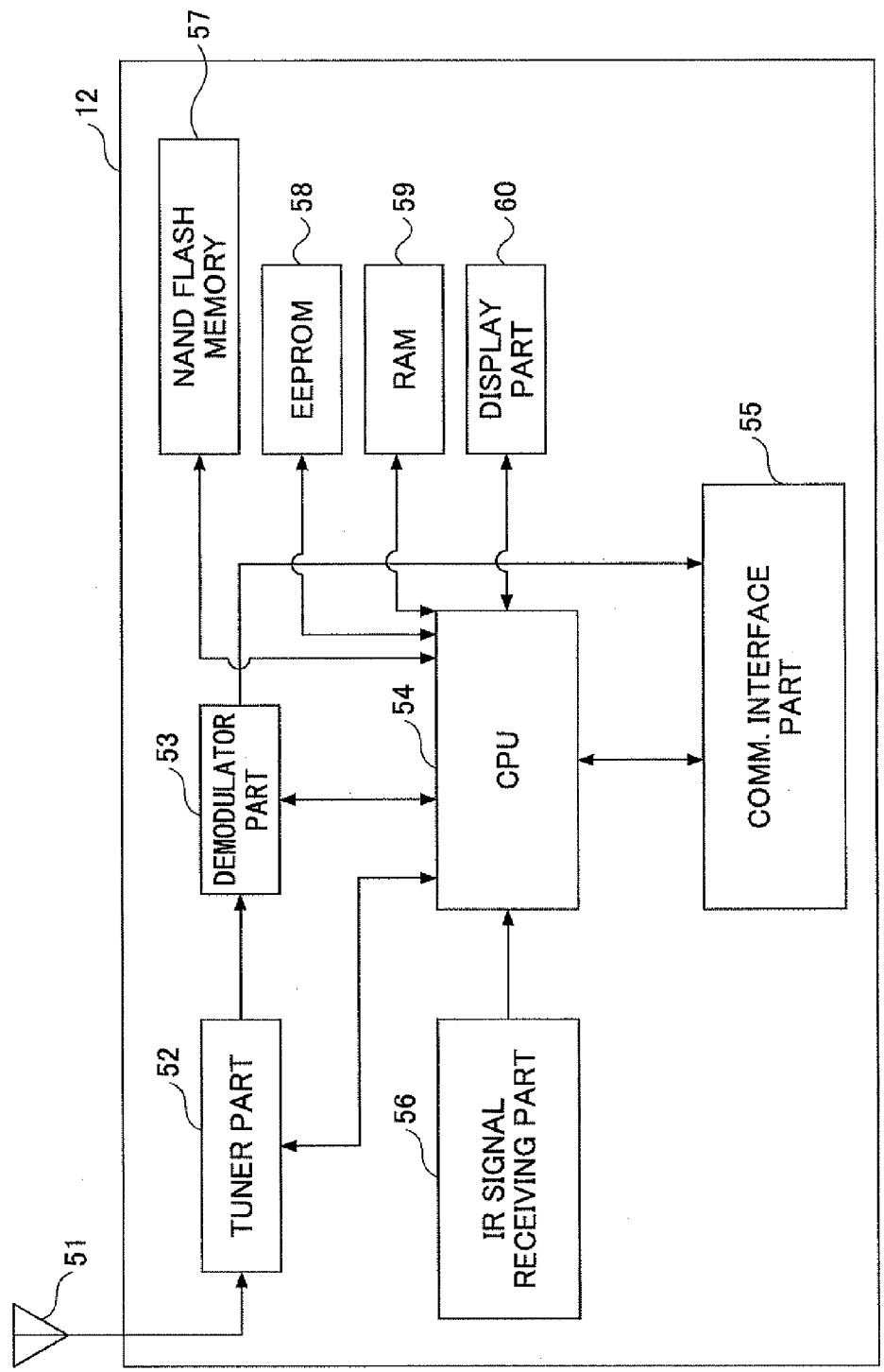
FIG. 4 is a diagram showing the hardware composition of an STB in this embodiment.

Next, the hardware composition of an STB 12 which is a communication device in this embodiment will be described. FIG. 4 is a diagram showing the hardware composition of the STB in this embodiment. As shown in FIG. 4, the STB 12 is constructed to include an antenna part 51, a tuner part 52, a demodulator part 53, a CPU 54, a communication interface part 55, an infrared signal receiving part 56, a NAND flash memory 57, an EEPROM 58, a RAM 59, and a display part 60.

The NAND flash memory 57, the EEPROM 58 and the RAM 59 constitute the storage unit of the STB 12.

The antenna part 51 is a broadcasting signal reception unit for receiving a broadcasting signal transmitted by electromagnetic waves. The antenna part 51 outputs the received signal to the tuner part 52.

The tuner part 52 extracts, from the broadcasting signal received by the antenna part 51, the broadcasting signal of a particular channel which is chosen by the user or predetermined in the STB 12, in accordance with a control signal from the CPU 54.

The demodulator part 53 performs the demodulation of the broadcasting signal according to a broadcasting format of the broadcasting signal extracted by the tuner part 52, in accordance with the control signal from the CPU 54. At this time, the demodulator part 53 performs the process to acquire the key information stored in the NAND flash memory 57, and decrypts the encrypted signal.

The CPU 54 is a control unit which controls processing of the whole STB 12. For example, in response to the content of a command from the user acquired by the infrared signal receiving part 56, the CPU 54 transmits a control signal for receiving a predetermined broadcasting signal corresponding to the content of the command, to the tuner part 52 or the demodulator part 53. The CPU 54 transmits the key information acquired from the NAND flash memory 57 to the demodulator part 53 to extract the predetermined broadcasting signal. The CPU 54 outputs the content (broadcast program) obtained from the demodulator part 53 to the TV 13 connected via the communication interface part 55. The CPU 54 performs read/write processing of the variety of information from/to the EEPROM 58 or the RAM 59 if needed, or outputs the content of the command from the user acquired by the infrared signal receiving part 56, to the display part 60.

The communication interface part 55 is an interface circuit for transmitting and receiving data to and from the communication devices on the Ethernet. The communication interface part 55 transmits and receives data between the STB 12 and the HTTP server 11.

The infrared signal receiving part 56 receives a command signal of the infrared signal form transmitted from an operation unit, such as a remote controller, converts the command signal into the normal digital signal, and outputs the digital signal to the CPU 54. The CPU 54 performs the control corresponding to the digital signal.

The NAND flash memory 57 stores the setup information, such as the key information, in response to the control signal from the CPU 54. A flash memory, such as a NOR flash memory, may be used instead of the NAND flash memory 57.

The EEPROM 58 stores the setup information, such as the MAC address, in response to the control signal from the CPU 54. Moreover, in response to the control signal from the CPU 54, the EEPROM 58 may store a change of the setup information, such as a change of setting of a screen size or a resolution to be output to the TV 13 to which the STB 12 is connected, a change of setting of a contrast, a change of setting of a sound volume, a change of setting of switching of HD image/SD image, a change of setting of HDMI (high-definition multimedia interface), and a change of setting of I-LINK. The EEPROM 58 may also store various programs required for this embodiment.

The EEPROM 58 is a special type of EPROM (erasable and programmable ROM) that can be erased and rewritable by exposure to an electrical charge. The EEPROM 58 retains its contents even when the power is turned off, and has the advantage that it can cope with a program modification or specification change. However, the present disclosure is not limited to the EEPROM 58, and a mask ROM or a PROM may be used instead.

The RAM 59 is a storage unit for writing or reading the program for performing the process in this embodiment in accordance the control signal from the CPU 54. The RAM 59 may store various data, such as viewing log information, such as a program content which is viewed and listened with the TV 13, and a channel change. An SRAM, a DRAM, etc. may be used as the RAM 59. The present disclosure is not limited to the RAM 59 of this embodiment.

The display part 60 displays the channel number of a broadcast program output to the TV 13, the content of the broadcast program, a list of content names, various kinds of messages, etc. in accordance with the control signal from the CPU 54.

Next, a communication device setting process performed by the communication device setting apparatus of this embodiment at a time of the manufacturing processes of communication devices will be described with reference to FIG. 5 and FIG. 6.

Figure 5:
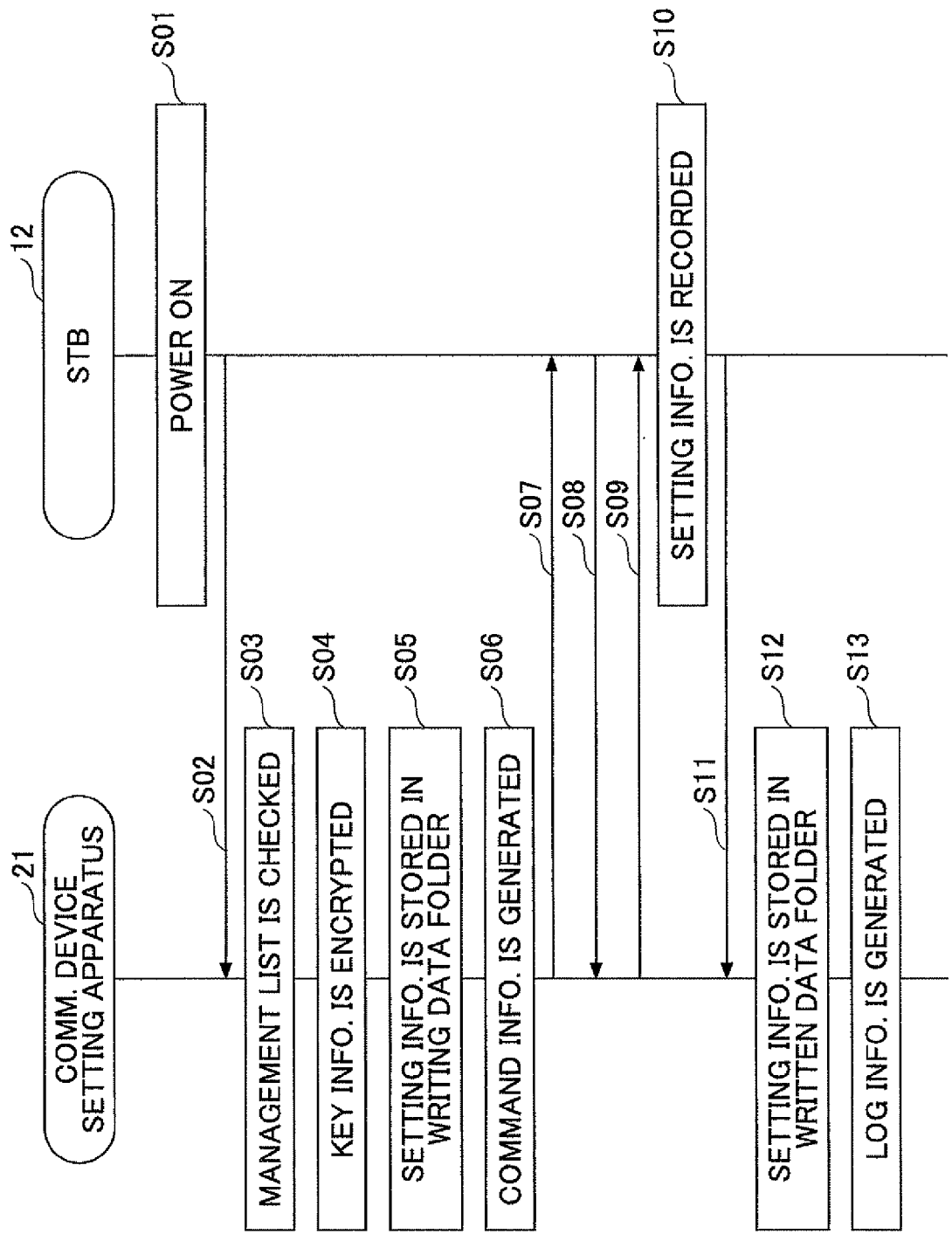
FIG. 5 is a sequence diagram for explaining a communication device setting process performed by the communication device setting apparatus of this embodiment.

FIG. 5 is a sequence diagram for explaining the communication device setting process performed by the communication device setting apparatus of this embodiment. FIG. 6 is a diagram for explaining the communication device setting process performed by the communication device setting apparatus of this embodiment.

Figure 6:
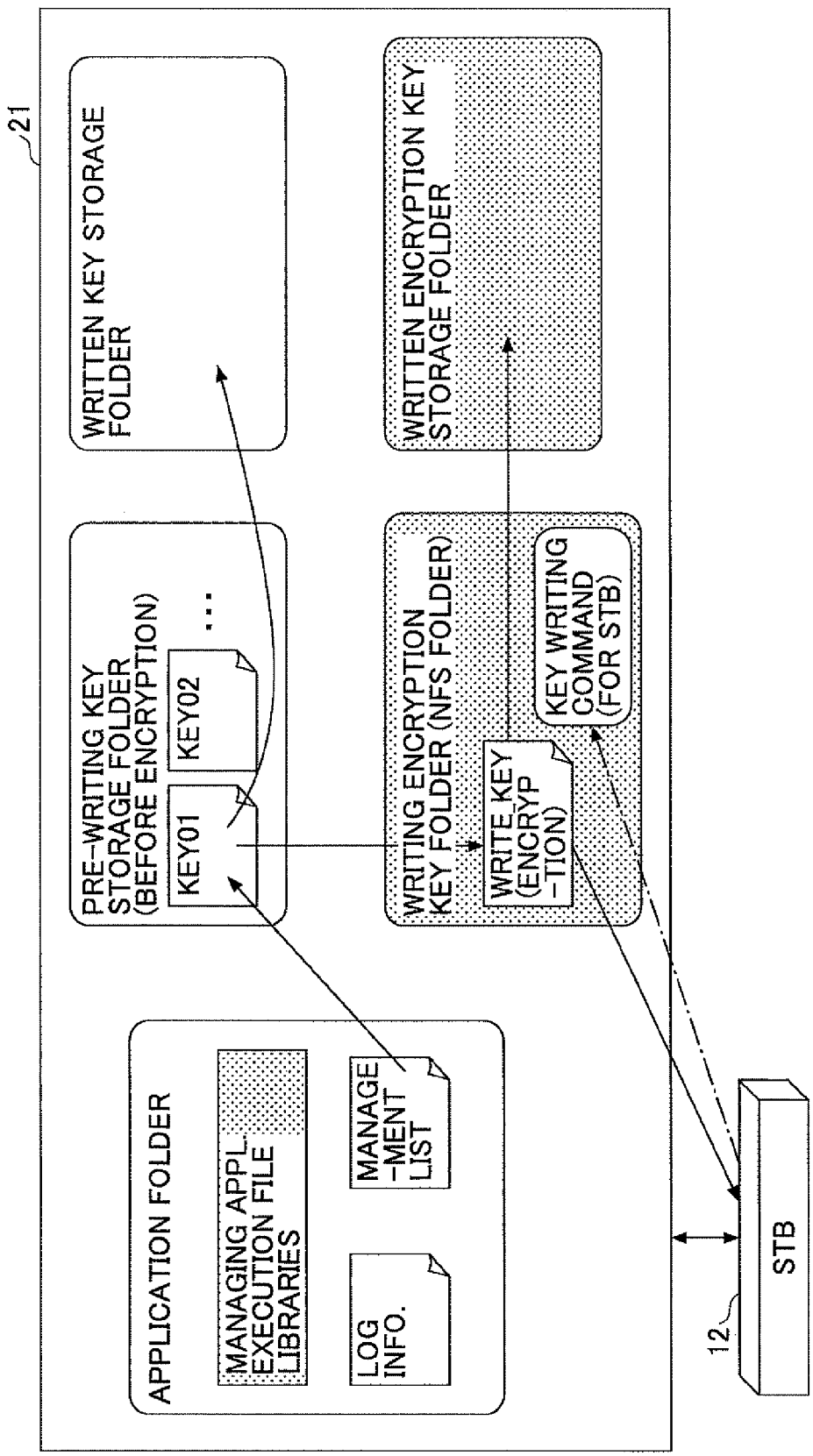
FIG. 6 is a diagram for explaining the communication device setting process performed by the communication device setting apparatus of this embodiment.

In the communication device setting apparatus 21 shown in FIG. 6, a plurality of folders are provided beforehand, which include an application folder, a pre-writing key storage folder, a written key storage folder, a writing encryption key folder, a written encryption key storage folder, etc. and a variety of items of the list information are stored in these folders. These items of the list information stored therein are managed by the setting management unit 36 in this embodiment.

First, the communication device setting process shown in FIG. 5 is started upon power up of the STB 12 (S01). The STB 12 has the address information that is the same as the predetermined address information of the HTTP server 11, and accesses the communication device setting apparatus 21 connected to the STB 12 by the Ethernet cable (S02).

Subsequently, the communication device setting apparatus 21 recognizes the access from the STB 12, and checks the management list which is set up beforehand in the communication device setting apparatus 21 (S03). Next, the communication device setting apparatus 21 acquires the MAC address from the management list, acquires the key information (stored beforehand) based on the file name of the key information before encryption contained in the management list, and encrypts the acquired key information (S04).

In order to allow the STB 12 (which is the communication device) to store the setup information, such as the MAC address and the encrypted key information, the communication device setting apparatus 21 stores the setup information in the predetermined recording area of the storage unit 33, such as the writing encryption key folder set beforehand (S05).

Subsequently, the communication device setting apparatus 21 generates the command information for causing the STB 12 to acquire the setup information stored in the predetermined recording area of the storage unit 33 at the step S05, and for causing the STB 12 to store the acquired setup information in the STB 12 (S06), and transmits the generated command information to the STB 12 connected thereto (S07).

For example, the command information generated at this time may include one or more commands or an execution batch file for performing the processes to acquire a file from an external device and store the acquired file in accordance with the UNIX. As the parameter of the command information, at least one of the address of the recording area of the external device, the file name of the file to be acquired, the address information of the NAND flash memory 57 or the EEPROM 58 for storing the acquired file, is included.

Subsequently, the STB 12 executes the command based on the command information received from the communication device setting apparatus 21, and accesses the communication device setting apparatus 21 (S08). Next, the STB 12 acquires the setup information from the predetermined recording area of the storage unit 33 in the communication device setting apparatus 21 (S09).

Subsequently, the STB 12 records the acquired setup information in the predetermined recording area of the NAND flash memory 57 or the EEPROM 58, or in the recording area set up by the command information (S10). Next, the STB 12 outputs a message indicating an end of the recording of the setup information therein, to the communication device setting apparatus 21 (S11).

When reception of the message indicating the end of the recording of the setup information in the STB 12 output at the step S11 is detected, the communication device setting apparatus 21 copies the content of the data storage folder of the setup information and stores the same in the written data storage folder (S12). In the step S12, the content of the predetermined folder of the key information before encryption is also copied and stored in the written data storage folder. Hence, the content of the setup information actually stored in the STB 12 can be checked at the communication device setting apparatus 21, and exact management of the key information can be performed. Therefore, the checking operation by the setting managing person can be performed correctly and efficiently.

Subsequently, the communication device setting apparatus 21 generates log information (S13). When the registration of the setup information is completed, the communication device setting apparatus 21 is connected to the following STB 12 in the network and repeats performing the above-described process for the following STB 12.

In this embodiment, when an error occurs in any of the steps S01-S13 described above, a corresponding error message may be generated and a screen including the error message may be output to the display monitor. Alternatively, in such a case, a warning sound, such as a predetermined beeping sound, may be output by the communication device setting apparatus 21.

The communication device with which an error has occurred is removed immediately, and the communication device setting apparatus 21 is connected to the following communication device (or the following STB 12) and performs the above-described process. In this case, the error is recorded in the log information. However, the following serial number in the management list is not assigned, and the serial number with which the error has occurred may be assigned to the following communication device (STB). That is, even when an error arises, the communication device with which the error has occurred is removed from the manufacturing processes but registration of the setup information is continuously performed. Quick processing is possible by assigning a MAC address, a serial number, and key information, sequentially to the following communication device without performing a special additional process.

When registration of the setup information is impossible due to a communication error or the like, resetting of that communication device may be performed after the sequentially performed communication device setting process is completed. However, the resetting process in that case may be performed by using new setup information, without using the setup information with which the error has occurred. Thereby, the management can be performed easily and correctly.

Next, the communication device setting process performed by the communication device setting apparatus of this embodiment will be described with reference to FIG. 6.

In the communication device setting process of FIG. 6, operation at the time of the writing of DRM-key (key information) is as follows. After the MAC address and the serial number are written in the setting process performed by the communication device setting apparatus of this embodiment, the DRM key (key) which is the key information will be written.

First, when the communication device setting apparatus 21 is accessed by the STB 12 at a time of starting of the STB 12, the server thread of the management application of the communication device setting apparatus 21 recognizes the access from the STB 12, and the communication device setting apparatus 21 starts performing a MAC address writing process.

Next, the communication device setting apparatus 21 searches the management list shown in FIG. 6, and acquires from the management list the MAC address and each file name of the keys to be written. Furthermore, each key to be written is encrypted and the encrypted key is stored in a predetermined folder. In the example shown in FIG. 6, the key before encryption and the key after encryption are stored in the predetermined folders.

Next, the encrypted key "WriteKey (encryption)" is acquired by the STB 12 and written to the STB 12 in accordance with a mounting command for mounting the predetermined folders of the communication device setting apparatus 21 which is sent to the STB 12 by the communication device setting apparatus 21. Specifically, the STB 12 performs NFS (network file system) mounting of the folders containing the encryption keys, executes the key writing commands, and causes the keys in the communication device setting apparatus 21 to be written in the STB 12.

Next, after the writing of the keys in the STB 12 is completed, the communication device setting apparatus 21 moves the encrypted key from the writing encryption key folder shown in FIG. 6 to the written encryption key storage folder. In this case, the file moving is performed with the original file name (key01). Thereby, the file name does not become complicated and the management can be performed easily.

As described above, the communication device setting apparatus 21 moves the key before encryption to the predetermined folder in which the written key is stored. After the writing is performed, the "WriteKey" file of the writing encryption key folder will be deleted.

In the communication device setting process of this embodiment, accessing from the STB 12 to the communication device setting apparatus 21 upon power up of the STB 12 is recognized. The process of writing the MAC address and the key information is started. The communication device setting apparatus 21 searches the management list and acquires the MAC address and the keys to be written. The communication device setting apparatus 21 encrypts the keys to be written so that the encrypted keys are placed in the predetermined folders, and writes the encrypted keys from the predetermined folders in the STB 12. After the writing of the keys in the STB 12 is completed, the encrypted key and the key before encryption are moved and stored in the corresponding folders, respectively. The communication device setting process described above can be performed in this manner. Hence, the setup information can be registered in the communication device correctly and efficiently.

In this embodiment, the key information can be managed correctly by storing the encrypted key and the key before encryption in the corresponding folders, respectively. However, the present disclosure is not limited to this embodiment. Alternatively, either of the encrypted key and the key before encryption may be stored in the written key folder. Alternatively, if the writing of the keys is normally performed, the key information in both the folders may be deleted.

Next, the management list (list information) provided in the communication device setting apparatus of this embodiment will be described. FIG. 7A and FIG. 7B are diagrams showing an example of the management list in this embodiment. FIG. 7A shows an example of the management list before the communication device setting process, and FIG. 7B shows an example of the management list in the process of communication device setting.

As shown in FIG. 7A, the setup information in the management list prior to the communication device setting process is formed in a data structure including data items of "MAC address", "HDCP key file name", "Marlin key file name" and "writing state". In this embodiment, the MAC address, the key information included in the file of the "Marlin key file name" and/or the key information included in the file of the "HDCP key file name" will be referred to as the setup information. When the communication device setting apparatus is connected to the STB 12 and the STB 12 is started, a process of writing (registration) of the setup information is performed. When the writing process has not yet been performed, the writing state of the management list is an unregistered state ("unreg").

When a plurality of communication device setup information items are set up, list information is overwritten to the management list as shown in FIG. 7B according to the corresponding stage. Specifically, as shown in FIG. 7B, the data of the setup information in the management list in the process of communication device setting is formed in a data structure including data items of "factory name", "date of writing", "serial number", "MAC address", "HDCP key file name" and "Marlin key file name". In the example of FIG. 7B, it is illustrated that registration of the setup information has been completed for the five STBs. In this manner, as is apparent from the overwritten data, it is possible to easily detect how many STBs in which registration of the setup information are completed.

The contents of data items, the sequence of writing data items, the data configuration, etc. according to the present disclosure are not restricted to this embodiment. For example, an IP address may also be registered as an item of the setup information. When the key information does not have to be set to the STB 12, the key information may not be included in the management list of FIG. 7A or FIG. 7B.

Alternatively, key information of another type and other items of the setup information may be included in the management list in this embodiment. For example, by applying this embodiment, registration and change of the setup information stored in the EEPROM, such as setting of a screen size and a resolution, setting of a contrast, setting of a sound volume, setting of switching of HD image/SD image, setting of HDMI (high-definition multimedia interface), and setting of I-LINK, may also be made.

As described above, according to the present disclosure, various setup operations for the communication devices can be performed correctly and efficiently. Specifically, the data to be written can be automatically searched at a time of writing of a MAC address, key information, etc., and the key information can be encrypted and written, and it is possible to avoid occurrence of errors (double writing, writing omission, etc.) in the writing of the MAC address and the key information. The writing operation is performed automatically with the shortest time, and reduction of the unnecessary efforts and time is possible.

According to the present disclosure, the server automatically performs the management and classification of the MAC address and the key information at the time of writing, and the managing person does not perform writing of data. This is effective from a viewpoint of security protection, and a mistake of the management will be eliminated.

According to the present disclosure, an operator simply performs connection of a target communication device to the communication device setting apparatus by an Ethernet cable, and turning on of a power supply of the communication device, and does not perform other operations, such as writing of data. Therefore, it is possible to avoid occurrence of an error.

If the power switch of the communication device is turned on, the searching, writing and management processes are performed automatically, and the operator does not need to be conscious of the data control. Therefore, a management mistake does not occur, and the efforts and time for can be reduced. According to the present disclosure, the third party cannot view the confidential data and the problem of security is eliminated.

According to the present disclosure, a series of management processes can be performed by using the communication device setting apparatus which is arranged to act as if it was a HTTP server. The present disclosure can be applied for the maintenance.

The present disclosure can be applied for automatically changing the initial setting of communication devices, such as STBs, and the software modules of the STBs can be updated periodically or at a predetermined timing indicated by a command execution request.

Because the Internet function is also carried in a digital TV, the present disclosure can be applied for digital-appliances devices and digital TVs having the Internet function, PCs, personal digital assistants and game machines having the communicating function. In the case of the communication device described above, the places to be accessed simultaneously with the turning on of the power supply differ. In this case, a menu screen is prepared and items, such as "initial-setting change", are set up in the menu screen. If the item "initial-setting change" is selected in the menu screen, the accessing is performed by using the address of the communication device setting apparatus 21, and the above-described process of the present disclosure can be performed by the communication device setting apparatus 21.

The present disclosure is also applicable to the writing operations, and management tasks of device-specific security information on an IP receiver (in which a web browser capable of viewing HTML data is arranged) provided with the installed software modules.

As described in the foregoing, according to the present disclosure, various setup operations for communication devices can be performed correctly and efficiently.

The present disclosure is not limited to the above-described embodiments, and variations and modifications may be made without departing from the scope of the present disclosure.

What is claimed is:

1. A communication device setting apparatus arranged to register setup information in a communication device that is connected to the communication device setting apparatus via a communication network, comprising:
   a hardware processor configured to execute
   a device setting unit to recognize an access from the communication device upon power up of the communication device, acquire setup information, which is specific to the communication device and contains a MAC address of the communication device, from list information pre-recorded in the communication device setting apparatus, and perform a setting process to set the acquired setup information in the communication device;
   a setting management unit to detect an end of the setting process performed by the device setting unit, change the list information based on the setup information having been set in the communication device after the end of the setting process, and manage the communication device according to the changed list information; and
   a key information generating unit to acquire key information via a corresponding key file name contained in the list information, and encrypt the acquired key information, wherein the setup information contains the encrypted key information from the key information generating unit,
   wherein, after the device setting unit performs the setting process to set the acquired setup information in the communication device, the setting management unit moves the encrypted key information from a writing encryption key folder to a written encryption key storage folder without changing the key file name.

2. The communication device setting apparatus according to claim 1, wherein the key information contains at least one of a HDCP key and a Marlin key.

3. The communication device setting apparatus according to claim 1, wherein the device setting unit generates command information for causing the communication device to receive the setup information, and outputs the generated command information to the communication device.

4. The communication device setting apparatus according to claim 1, wherein the communication device setting apparatus stores address information that is the same as address information which is beforehand registered in the communication device and used by the communication device to access an HTTP server on the network.

5. The communication device setting apparatus according to claim 1, wherein the communication device is one of a set-top box, a television set, a personal computer, a personal digital assistant, and a game machine.

6. A communication device setting method for use in a communication device setting apparatus to register setup information in a communication device that is connected to the communication device setting apparatus via a communication network, the communication device setting apparatus including a device setting unit and a setting management unit, the communication device setting method comprising:
   recognizing, by the device setting unit, an access from the communication device upon power up of the communication device;
   acquiring, by the device setting unit, setup information, which is specific to the communication device and contains a MAC address of the communication device, from list information pre-recorded in the communication device setting apparatus;
   performing, by the device setting unit, a setting process to set the acquired setup information in the communication device;
   detecting, by the setting management unit, an end of the setting process performed by the device setting unit;
   changing, by the setting management unit, the list information based on the setup information having been set in the communication device after the end of the setting process;
   managing, by the setting management unit, the communication device according to the changed list information;
   acquiring, by a key information generating unit of the communication device setting apparatus, key information via a corresponding key file name contained in the list information; and
   encrypting, by the key information generating unit, the acquired key information,
   wherein the setup information contains the encrypted key information,
   wherein, after the device setting unit performs the setting process to set the acquired setup information in the communication device, the setting management unit moves the encrypted key information from a writing encryption key folder to a written encryption key storage folder without changing the key file name.

7. The communication device setting method according to claim 6, wherein the key information contains at least one of a HDCP key and a Marlin key.

8. The communication device setting method according to claim 6, further comprising:
   generating, by the device setting unit, command information for causing the communication device to receive the setup information; and
   outputting, by the device setting unit, the generated command information to the communication device.

9. A non-transitory computer-readable recording medium storing a program which, when executed by a computer, causes the computer to perform the communication device setting method according to claim 6.

10. A communication system comprising:
    the communication device setting apparatus as claimed in claim 1; and
    the communication device including a hardware control unit that controls processing of
    a request process to, upon power up, request the communication device setting apparatus to acquire the setup information, which is specific to the communication device and contains the MAC address of the communication device, from the list information pre-recorded in the communication device setting apparatus;
    a command receiving process to receive command information generated by the communication device setting apparatus;
    an execution process to execute the command information for performing a process to access and retrieve the setup information from a predetermined recording area of a storage unit in the communication device setting apparatus; and
    an output process that outputs, to the communication device setting apparatus, a message indicating an end of recording of the setup information in the communication device.

11. The communication device setting method according to claim 6, further comprising:
    requesting, by a control unit of the communication device, upon power up, the communication device setting apparatus to acquire the setup information, which is specific to the communication device and contains the MAC address of the communication device, from the list information pre-recorded in the communication device setting apparatus;

receiving, by the control unit of the communication device, command information generated by the communication device setting apparatus;

executing, by the control unit of the communication device, the command information for performing a process to access and retrieve the setup information from a predetermined recording area of a storage unit in the communication device setting apparatus; and outputting, by the control unit of the communication device, a message to the communication device setting apparatus indicating an end of recording of the setup information in the communication device.

12. The communication device setting apparatus according to claim 1, further comprising:

an interface unit that directly connects to the communication device at a time of manufacturing or resetting of the communication device.

* * * * *